(12) United States Patent
Cheung et al.

(10) Patent No.: US 6,243,432 B1
(45) Date of Patent: *Jun. 5, 2001

(54) MODIFIED PASSIVE CONTAINMENT COOLING SYSTEM FOR A NUCLEAR REACTOR

(75) Inventors: Yee K. Cheung; Douglas M. Gluntz; Shyam S. Khorana, all of San Jose, CA (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/966,948

(22) Filed: Nov. 10, 1997

Related U.S. Application Data

(60) Provisional application No. 60/048,988, filed on Jun. 9, 1997.

(51) Int. Cl.[7] ......................................................... G21C 9/00
(52) U.S. Cl. ........................... 376/283; 376/282; 376/293; 376/298; 376/299
(58) Field of Search .................................... 376/282, 283, 376/293, 298, 299

(56) References Cited

U.S. PATENT DOCUMENTS

| | | | |
|---|---|---|---|
| 5,145,639 | * 9/1992 | Hui | 376/283 |
| 5,169,595 | * 12/1992 | Cooke | 376/299 |
| 5,282,230 | * 1/1994 | Billig et al. | 376/283 |
| 5,295,168 | * 3/1994 | Gluntz et al. | 376/283 |
| 5,353,318 | * 10/1994 | Gluntz | 376/283 |
| 5,761,262 | * 6/1998 | No et al. | 376/298 |

* cited by examiner

Primary Examiner—Michael J. Carone
Assistant Examiner—Jack Keith
(74) Attorney, Agent, or Firm—Armstrong Teasdale LLP

(57) ABSTRACT

Modified passive containment cooling systems for cooling a reactor core of a boiling water nuclear reactor are described. The reactor core is positioned in a reactor pressure vessel which is located in a drywell of the nuclear reactor. The passive containment cooling system (PCCS), in one form, includes an IC/PCC pool, a GDCS pool, a suppression pool, and a condensate drain tank. The IC/PCC and the GDCS pool each are substantially isolated from the drywell, and the suppression pool is separated from the drywell by a wall having a spill-over hole therein. An equalizing line extends between the suppression pool and the RPV and is configured to transport water from the suppression pool to the RPV. The condensate drain tank is positioned in the drywell and includes a base wall having a sidewall extending therefrom to define a fluid retaining cavity. A steam inlet line extends from within the drywell to a set of passive containment cooling condensers, which condense steam generated within the drywell to water. A condensate drain line extends from the set of PCC HXrs and into the drain tank retaining cavity so that the water flows from the PCC HXrs and into the retaining cavity. An injection line extends between the retaining cavity and the RPV to facilitate transporting the water from the drain tank and into the RPV to cool the reactor core.

18 Claims, 3 Drawing Sheets

MODIFIED PASSIVE CONTAINMENT COOLING SYSTEM FOR A NUCLEAR REACTOR

CROSS-REFERENCE TO RELATED APPLICATION

This application claims the benefit of U.S. Provisional Application No. 60/048,988, filed Jun. 9, 1997.

FIELD OF THE INVENTION

This invention relates generally to nuclear reactors and, more particularly, to passive containment cooling systems for such reactors.

BACKGROUND OF THE INVENTION

One known boiling water nuclear reactor includes an RPV positioned in a drywell, or containment, and a passive cooling containment system (PCCS). The RPV contains a core, and the drywell is designed to withstand pressure generated by the RPV and the core during operation. The PCCS is configured to limit the pressure within the containment to a pressure below a design pressure of the containment and to keep the RPV core substantially cool.

A typical PCCS includes a Gravity-Driven Cooling System (GDCS) and a wetwell. The GDCS is substantially isolated from the containment and includes a GDCS pool of water which is coupled to the RPV with an injection line. The wetwell includes a suppression pool of water and is separated from the containment by wall having a spill-over hole therein. The spill-over hole typically is positioned approximately 20 meters above the containment floor, and an equalizing line extends between the suppression pool and the RPV to facilitate transporting water from the suppression pool to the RPV. The equalizing line includes a remotely operated valve which is normally in the closed position and is movable between the closed position and the open position. Particularly, the valve is coupled to a remote computer or workstation, which is configured to transmit signal to the valve to either open or close the valve.

The PCCS further includes a set of passive containment cooling condensers (PCC HXrs) located in a pool of water, or IC/PCC pool, which is positioned outside the containment. The PCC HXrs are configured to condense steam generated within the containment and to drain the condensate to the floor of the containment. Particularly, a steam inlet line extends from within the containment to the PCC HXrs for transporting steam to the PCC HXrs, and a condensate drain line extends from the PCC HXrs and into the containment to transport the condensate, e.g., water, to the containment. The condensate draining from the PCC HXrs accumulates in a lower level of the containment and forms a pool of water.

In operation, the PCCS limits pressure within the containment to a pressure below the design pressure of the containment and keeps the core substantially cool. As one example, if the core begins to decay, e.g., because of a Loss-of-Coolant Accident (LOCA), the decaying core produces heat, which generates steam within the reactor containment. The steam inlet line transports the steam from the containment to the PCC HXrs, which condense the steam into condensate. The condensate is then transmitted from the PCC HXrs back into the containment via the condensate drain line and forms a pool of water in the containment.

After substantial condensation, a surface of the pool of water may reach the spill-over hole and flow through the spill-over hole and into the suppression pool. When condensate flows into the suppression pool, a substantially equal amount of water flows from the suppression pool and into the RPV through the equalizing line. Particularly, the equalizing valve is opened, e.g., by the computer, and water is transported from the suppression pool and into the RPV to keep the core substantially cool.

With the known PCCS, it is necessary for the condensate to form a pool of water almost 20 meters deep before flowing into the suppression pool, and thus causing water to enter the RPV to cool the core. In addition, the PCCS does not include any backup for cooling the core in the event of a possible equalizing line valve malfunction.

It would be desirable to provide an improved PCCS which facilitates cooling the reactor core quicker than with a known PCCS. It also would be desirable to provide such a system which includes a backup system for cooling the reactor core even if the equalizing line valve malfunctions.

SUMMARY OF THE INVENTION

These and other objects may be attained by a passive containment cooling system (PCCS) which, in one form, facilitates cooling a reactor core by utilizing a secondary cooling circuit. Particularly, the PCCS includes a condensate drain for cooling the reactor core independent of the suppression pool.

The condensate drain tank includes a base wall and a sidewall, and the sidewall extends from the base wall to define a fluid retaining cavity. The condensate drain tank is positioned in the reactor containment and is coupled between the reactor pressure vessel and the passive containment cooling condensers (PCC HXrs). Particularly, at least one PCC HXr condensate drain line extends from the PCC HXr and into the fluid retaining cavity so that condensibles, e.g., water, flow from the PCC HXr and into the retaining cavity. In addition, an injection line extends between the retaining cavity and the RPV to facilitate transporting fluid from the drain tank to the RPV. Particularly, the injection line includes a valve which is movable between a normally closed position and an open position.

In operation, the PCCS limits containment pressure within the containment to a pressure below a design pressure of the containment and keeps the core substantially cool. As one example, if the core begins to decay, e.g., because of a Loss-of-Coolant Accident (LOCA), the decaying core produces heat, which generates steam within the reactor. The steam enters the PCC HXr via a steam inlet line. The PCC HXr condenses the steam into water, and discharges the water through the condensate drain line and into the retaining cavity of the drain tank. As the retaining cavity begins to fill, the injection line valve is opened and the water flows from the drain tank to the RPV, where the water cools the core.

In the event that water overflows the drain tank, the water falls to the floor of the containment and forms a pool of water. As described above with a known reactor and PCCS, substantial accumulation of water in the containment will cause the pool of water to rise within the containment and eventually flow into the suppression pool via the spill-over hole. Water then flows through from the suppression pool and into the RPV via the equalizing line to further cool the reactor.

The above described PCCS is believed to facilitate cooling the reactor core quicker than with a known PCCS. Such PCCS also provides a secondary cooling circuit within the reactor for cooling the reactor core even if the equalizing line valve malfunctions.

DETAILED DESCRIPTION

Figure 1:
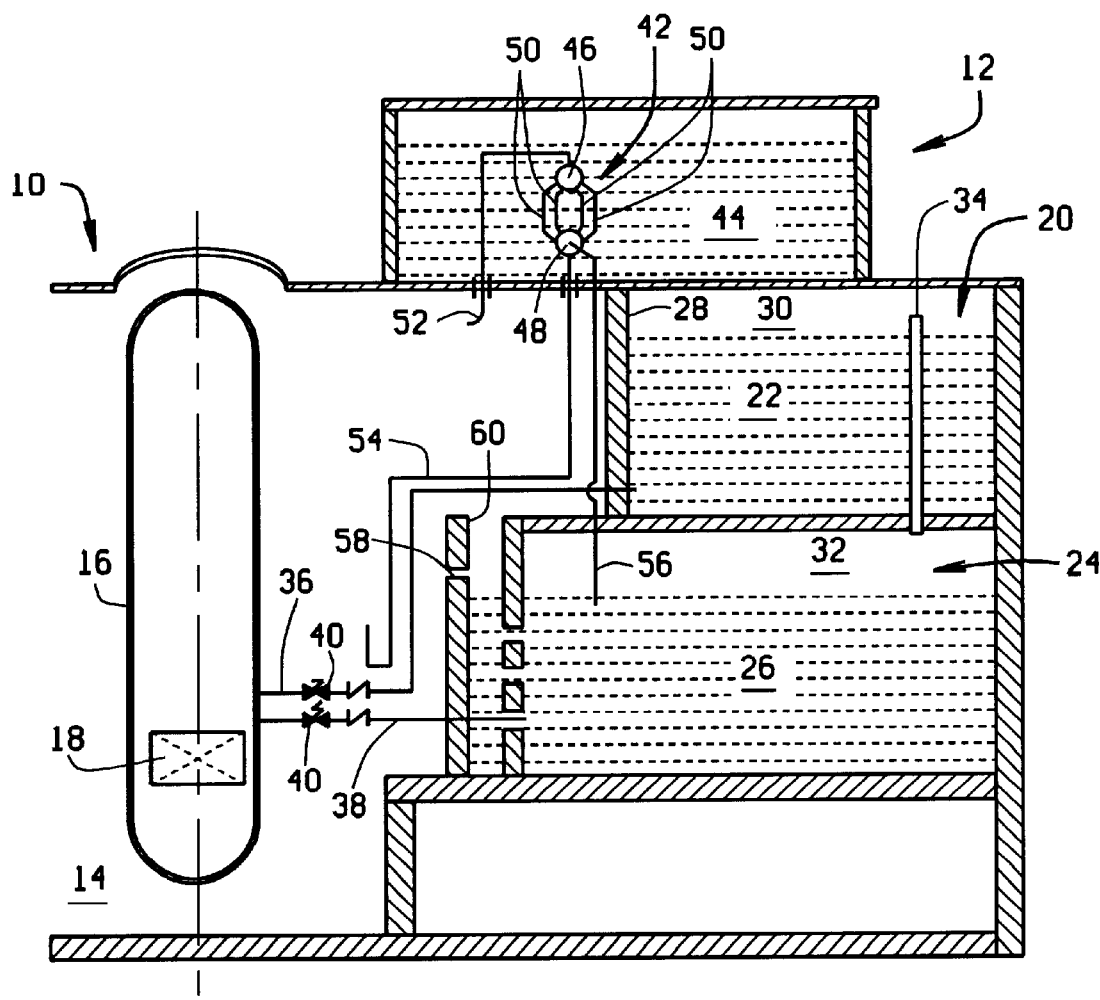
FIG. 1 is a schematic illustration of a known boiling water nuclear reactor including a known passive containment cooling system.

FIG. 1 is a schematic illustration of a known boiling water nuclear reactor 10 having a passive containment cooling system 12. Reactor 10 includes a drywell, or containment, 14, and a reactor pressure vessel (RPV) 16 having a core 18 is positioned in drywell 14. System 12 includes a Gravity-Driven Cooling System (GDCS) 20 including a GDCS pool 22 and a wetwell 24 having a suppression pool 26. A wall 28 substantially isolates GDCS 20 from drywell 14, and an air space 30 above GDCS pool 22 is connected to an air space 32 above suppression pool 26 via a pipe 34 or other connecting element. GDCS pool 22 is coupled to RPV 16 via a GDCS injection line 36 and suppression pool 26 is coupled to RPV 16 via an equalizing line 38. Each line 36 and 38, respectively, includes a valve 40 that is normally closed and thus substantially prevents water from flowing between pools 22 and 26, respectively, and RPV 16. Valves 40 are coupled to a computer or workstation (not shown) and are configured to open when receiving appropriate signals from such computer or workstation.

System 12 further includes a set of passive containment cooling condensers (PCC HXrs) 42 (only one PCC HXr 42 is shown in FIG. 1) positioned in a pool of water, or IC/PCC pool, 44, which is located outside containment 14. Each PCC HXr 42 includes an upper drum 46, a lower drum 48 and a plurality of tubes 50 extending between upper drum 46 and lower drum 48. Tubes 50 are configured to condense steam received from upper drum 46 and to transport the condensed steam to lower drum 48. A steam inlet line 52 extends between containment 14 and upper drums 46 (only one upper drum 46 is shown in FIG. 1) and is configured to transport steam from within containment 14 to upper drums 46. A condensate drain line 54 extends from each lower drum 48 (only one lower drum 48 is shown in FIG. 1) and into containment 14. A noncondensibles vent line 56 extends from each lower drum 48 and into suppression pool 26.

In operation, system 12 limits pressure within containment 14 to a pressure below the design pressure of containment 14 and keeps core 18 substantially cool. As one example, if core 18 begins to decay, e.g., because of a Loss-of-Coolant Accident (LOCA), decaying core 18 produces heat, which generates steam within reactor 10. The steam enters upper drums 46 of PCC HXrs 42 via steam inlet line 52 and is substantially condensed in tubes 50 so that lower drums 48 contain condensed steam, or condensate, and noncondensed steam, or noncondensibles. The condensate is drained from lower drums 48 and into containment 14 via drain line 54, and the noncondensibles are exhausted from lower drums 48 into suppression pool 26 via noncondensibles vent line 56.

The condensate draining from lower drums 48 accumulates in a lower level of containment 14 and forms a pool of water. After substantial condensation, a surface of the pool of water may reach a spill-over hole, or opening, 58 which extends through a wall 60 positioned between suppression pool 26 and drywell 14. Any further condensation results in water flowing from the pool of water and into suppression pool 26, and a substantially equal amount of water will flow from suppression pool 26 to RPV 16 through equalizing line 38. Particularly, the computer transmits signals to valve 40 and causes valve 40 in equalizing line 38 to open so that water from suppression pool 26 travels through equalizing line 38 and into RPV 16 to keep core 18 substantially cool. The configuration and operation of reactor 10 and system 12 are well known.

As explained above, spill-over holes 58 in known reactors, e.g., reactor 10, typically are located approximately 20 meters above the floor of drywell 14. Accordingly, a significant amount of condensation must occur before water flows from drywell 14 to suppression pool 26 and hence to RPV 16. In addition, in the unlikely event that a valve 40 fails to open, system 12 does not provide for water to enter RPV 16 and cool core 18.

Figure 2:
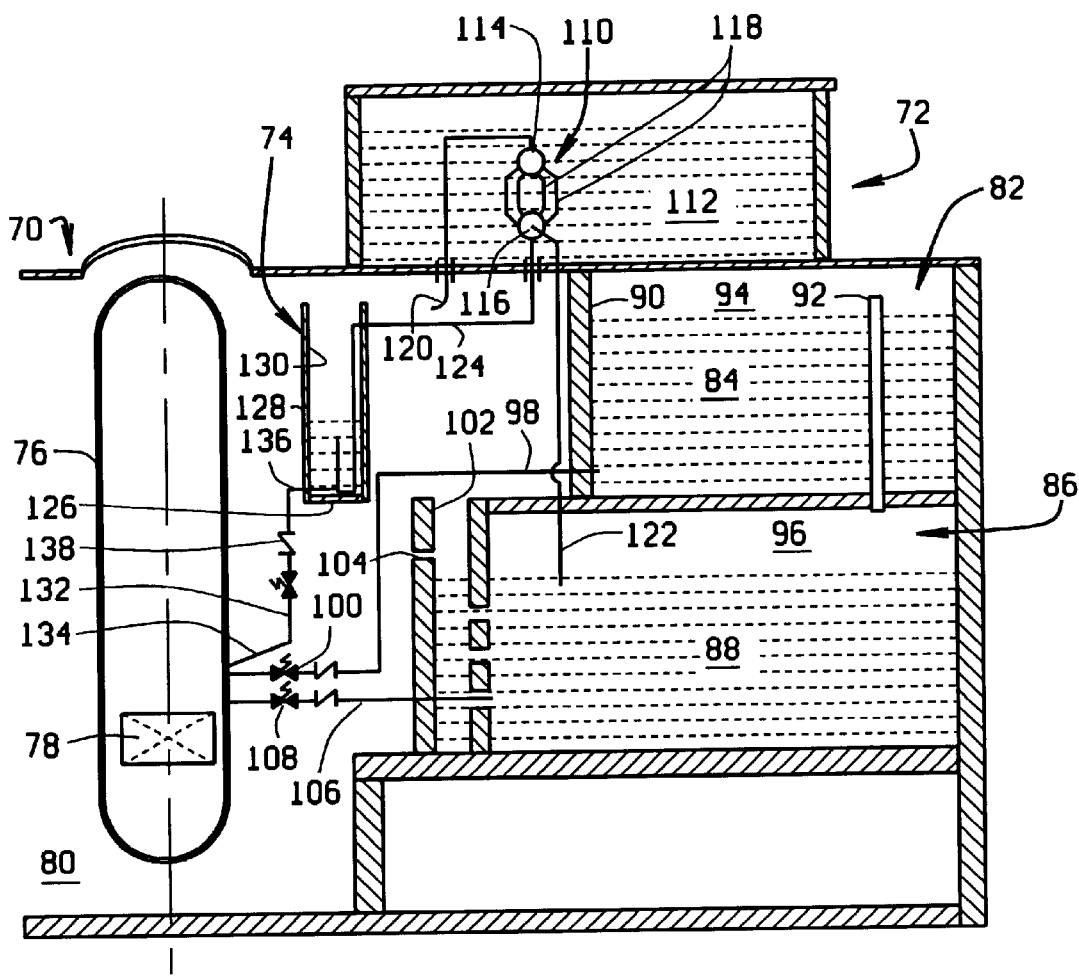
FIG. 2 is a schematic illustration of a boiling water reactor including a passive containment cooling system having a condensate drain tank in accordance with one embodiment of the invention.

FIG. 2 is a schematic illustration of a boiling water nuclear reactor 70 having a passive containment cooling system 72 which includes a condensate drain tank 74 in accordance with one embodiment of the present invention. Reactor 70, like reactor 10, includes a reactor pressure vessel (RPV) 76 having a reactor core 78. RPV 76 and core 78 are positioned in a drywell, or containment, 80, which is configured to substantially withstand pressure caused by external forces, e.g., steam, during reactor operation.

System 72 includes a Gravity-Driven Cooling System (GDCS) 82 having a GDCS pool 84 and a wetwell 86 having a suppression pool 88. A wall 90 substantially separates and isolates GDCS 82 and GDCS pool 84 from drywell 80. A pipe 92 or other connecting element extends from an air space 94 above GDCS pool 84 to an air space 96 above suppression pool 88. A GDCS injection line 98 extends between GDCS pool 84 and RPV 16 and includes a valve 100 configured to move between a closed position and an open position. Valve 100 and injection line 98 are configured to cooperate to transmit fluid between GDCS pool 84 and RPV 76. Gravity-Driven Cooling Systems are well known.

Suppression pool 88 is separated from drywell 80 by a wall 102 having at least one opening, or spill-over hole, 104 extending therethrough. An equalizing line 106 extends between suppression pool 88 and RPV 76 and includes a valve 108 which movable between a normally closed position and an open position. Valve 108 is coupled in a well known manner to a remote computer or workstation (not shown in FIG. 2) configured to remotely open and close the valve. Equalizing line 106 and valve 108 are configured to cooperate and transmit fluid between suppression pool 88 and RPV 76. Suppression pools, wetwells, and spill-over holes are well known.

System 72 further includes a set of, e.g., two, passive containment cooling condensers (PCC HXrs) 110 (only one PCC Hxr 110 is shown in FIG. 2) positioned in a pool of water, or IC/PCC pool, 112, which is located outside containment 80. Each PCC Hxr 110 includes an upper drum 114, a lower drum 116 and a plurality of tubes 118 extending between upper drum 114 and lower drum 116. Tubes 118 are configured to condense steam received from upper drum 114 and to transport the condensed steam to lower drum 116. A steam inlet line 120 extends between containment 80 and upper drums 114 (only one upper drum 114 is shown in FIG. 2) and is configured to transport steam from within containment 80 to upper drums 114. A noncondensibles vent line 122 extends from each lower drum 116 (only one lower drum 116 is shown in FIG. 2) and into suppression pool 88.

A condensate drain line 124 extends from each lower drum 116 and into condensate drain tank 74 so that each PCC HXr 110 is coupled to condensate drain tank 74. For example, both a first PCC HXr 110 and a second PCC HXr 110 are coupled via respective drains lines 124 to drain tank 74. Alternatively, each PCC HXr 110 may be coupled to a separate drain tank 74, e.g., a first PCC HXr 110 may be coupled to a first condensate drain tank 74, and a second PCC HXr 110 may be coupled to a second drain tank 74.

Each condensate drain tank 74 (only one drain tank 74 is shown) is positioned in drywell 80 and includes a base wall 126 having a sidewall 128 extending therefrom to define a fluid retaining cavity 130. An injection line 132 extends between RPV 76 and each drain tank 74 and is configured to transport fluid between drain tank 74 and RPV 76. Particularly, a first end 134 of injection line 132 is coupled to RPV 76 and a second end 136 of injection line 132 extends through drain tank sidewall 128 and into fluid retaining cavity 130. Injection line 132 includes a valve 138 positioned between its first and second ends 134 and 136, respectively, and valve 138 is configured to move between a closed position, where fluid is substantially prevented from transmitting between drain tank 74 and RPV 76, and an open position, where fluid is enabled to transmit between drain tank 74 and RPV 76. Valve 138 is coupled to the remote workstation of such reactor in the same manner as equalizing line valve 108 is coupled to such workstation.

Figure 3:
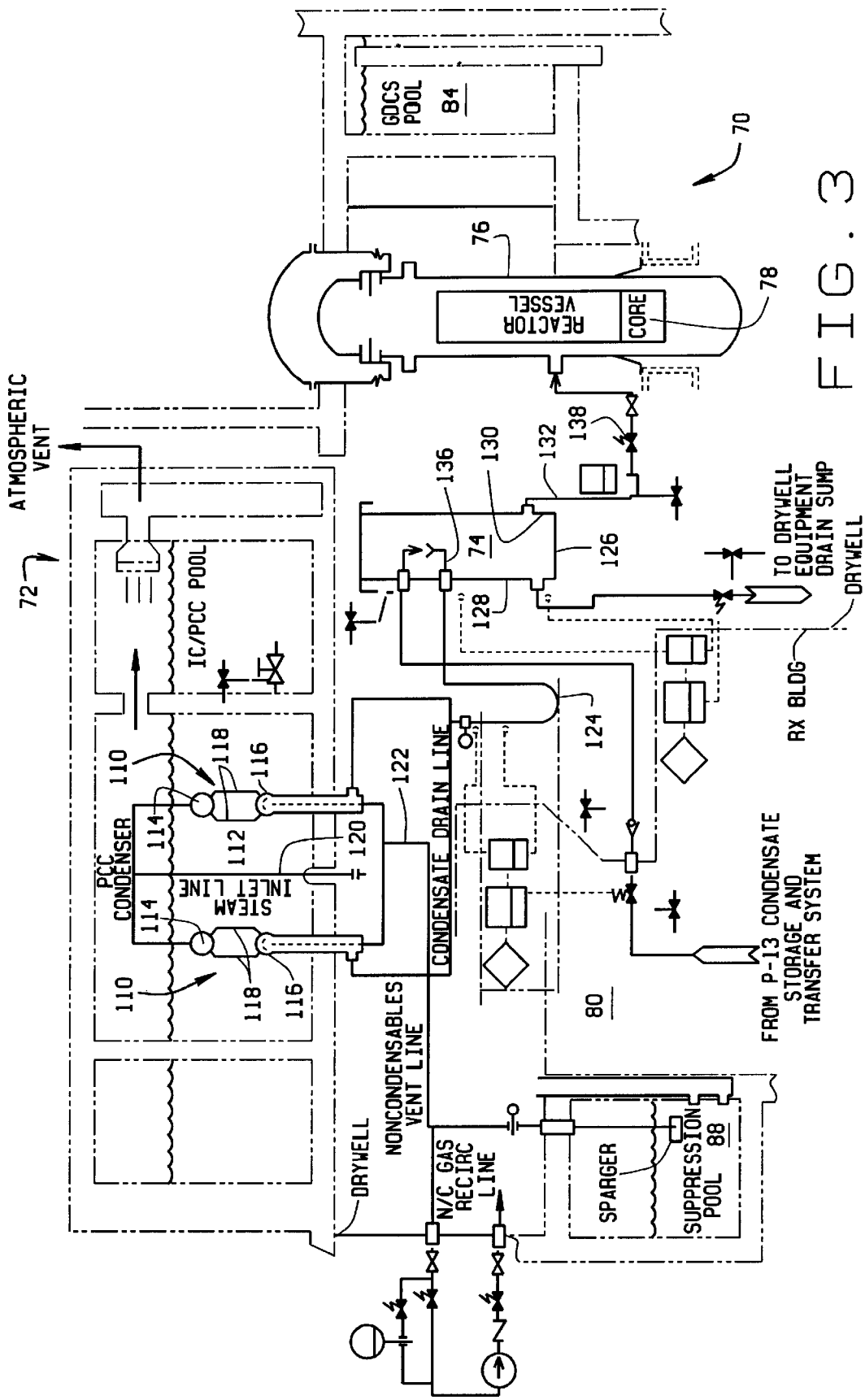
FIG. 3 is a more detailed schematic illustration of the reactor and passive containment cooling system shown in FIG. 2.

FIG. 3 is a more detailed schematic illustration of passive containment cooling system 72. As shown more clearly, system 72 includes two PCC HXrs 110 positioned in IC/PCC pool 112. Each PCC HXr 110 includes one upper drum 114 and one lower drum 116. Lower drums 116 are coupled in electrical parallel circuit connection with drain tank 74 via condensate drain line 124. Particularly, condensate drain line 124 is positioned so that second end 136 thereof is disposed within fluid retaining cavity 130 and so that fluid travelling from lower drums 116 and through condensate drain line 124 flows into fluid retaining cavity 130.

Injection line 132 extends between drain tank 74 and RPV 76, as described above, and is configured to transport fluid between drain tank 74 and RPV 76. Valve 138 is configured to normally be in the closed position, where fluid is substantially prevented from transmitting between drain tank 74 and RPV 76. A remote workstation or computer (not shown in FIG. 3), for example, is coupled to valve 138 and configured to move valve to the open position, where fluid is enabled to transmit between drain tank 74 and RPV 76, during certain preselected RPV conditions, e.g., during a LOCA.

In operation, system 72 limits containment pressure within containment 80 to a pressure below a design pressure of containment 80 and keeps core 78 substantially cool. As one example, if core 78 begins to decay, e.g., because of a Loss-of-Coolant Accident (LOCA), decaying core 78 produces heat, which generates steam within reactor 70. The steam enters upper drums 114 of PCC HXrs 110 via steam inlet line 120 and is substantially condensed in tubes 118 so that lower drums 116 contain condensed steam, or condensate, and noncondensed steam, or noncondensibles. The noncondensibles are exhausted from lower drums 116 into suppression pool 88 via noncondensibles vent line 122 and the condensibles are drained from lower drums 116 and into drain tank 74 via drain line 124.

The condensate draining from lower drums 116 accumulates in fluid retaining cavity 130 of drain tank 74. As retaining cavity 130 begins to fill with condensate, valve 138 in injection line 132 opens to facilitate transporting water between drain tank 74 and RPV 76. Particularly, and during a LOCA, for example, the computer or workstation transmits signals to valve 138 and causes valve 138 to open so that water from drain tank 74 travels through injection line 132 and into RPV 76 to keep core 78 substantially cool. Accordingly, drain tank 74, injection line 132 and valve 138 operate as a secondary cooling circuit for reactor 70.

The above described passive containment cooling system 72 is believed to improve water flow from outside RPV 76 to RPV core 78 and thus reduce core damage frequency in boiling water nuclear reactor 70. Specifically, water may be transported between drain tank 74 and RPV 76 far sooner than water typically is transported between a suppression pool and an RPV in a typical reactor. In a typical reactor, as described above in connection with reactor 10, condensibles must collect for a vertical volume of approximately 20 meters before flowing into the suppression pool and hence into the RPV. However, condensibles may flow between drain tank 74 and RPV 76 much sooner.

In addition, such cooling system 72 provides a new and redundant coolant flow path into RPV 76 which is independent of suppression pool 88. Accordingly, even if, for example, equalizing line valve 108 failed to operate correctly, injection line 132 and valve 138 still facilitate cooling RPV core 78. Similarly, even if injection line valve 138 failed to operate correctly, e.g., open, condensibles would collect in retaining cavity 130 until they flowed to the floor of containment 80, and condensibles would continue to collect in containment 80 until they flowed through spillover hole 104 and into suppression pool 88. Water would then flow between suppression pool 88 and RPV 76 via equalizing line 106 and valve 108.

The above described drain tank 74, injection line 132 and valve 138 may be implemented in connection with a known simplified boiling water reactor, such as reactor 10. Valve 138 is coupled to a remote workstation of such reactor in the same manner as equalizing line valve 40 currently is coupled to the workstation in known simplified boiling water reactors.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, the above described system was described in connection with one set of two PCC HXrs coupled to one condensate drain tank. However, such system may include more than one drain tank, and also may include either fewer than two or more than two PCC HXrs coupled to each drain tank. Accordingly, the spirit and scope of the invention are to be limited only by the terms of the appended claims.

What is claimed is:

1. A passive containment system for a nuclear reactor, the nuclear reactor including a reactor pressure vessel having a core disposed therein, the reactor pressure vessel located in a containment, said system comprising:
   at least one passive containment cooling condenser;
   a suppression pool in flow communication with said passive containment cooling condenser;
   a gravity driven cooling system pool connected to said suppression pool by a pipe;

at least one condensate drain tank positioned in the containment, said passive containment cooling condenser coupled to said condensate drain tank;

an injection line extending between the reactor pressure vessel and said condensate drain tank, said injection line configured to transport fluid between said drain tank and the reactor pressure vessel;

a gravity driven cooling system injection line extending between the reactor pressure vessel and said gravity driven cooling system pool, said gravity driven cooling system injection line configured to transport fluid between said gravity driven cooling system pool and the reactor pressure vessel;

an equalizing line extending between the reactor pressure vessel and said suppression pool, said equalizing line configured to transport fluid between said suppression pool and the reactor pressure vessel; and a wall having a spill-over hole therein, said wall separating said suppression pool from a drywell located in the containment.

2. A passive containment system in accordance with claim 1 wherein said condensate drain tank comprises a base wall and a sidewall, said sidewall extending from said base wall to define a fluid retaining cavity.

3. A passive containment system in accordance with claim 1 wherein said injection line comprises a first end and a second end, and wherein a valve is positioned between said first and second ends.

4. A passive containment system in accordance with claim 3 wherein said valve is movable between an open position and a closed position.

5. A passive containment system in accordance with claim 1 further comprising at least one condensate drain line extending between said at least one passive containment cooling condenser and said at least one condensate drain tank.

6. A passive containment system in accordance with claim 1 comprising a set of passive containment cooling condensers, said set comprising two passive containment cooling condensers.

7. A passive containment system in accordance with claim 1 comprising one condensate drain tank.

8. A method for cooling a core of a nuclear reactor utilizing a cooling system, the nuclear reactor including a containment having a reactor pressure vessel located therein, the core disposed within the reactor pressure vessel, the cooling system including at least one passive containment cooling condenser, at least one condensate drain tank, and a suppression pool connected to a gravity driven cooling system pool by a pipe, said method comprising the steps of:

positioning the condensate drain tank in the containment;

coupling the passive containment cooling condenser to the suppression pool;

coupling the suppression pool and the gravity driven cooling system pool to the reactor pressure vessel;

coupling the passive containment cooling condenser to the condensate drain tank; and coupling the condensate drain tank to the reactor pressure vessel.

9. A method in accordance with claim 8 wherein the condensate drain tank includes a base wall and a sidewall, the sidewall extending from the base wall to define a fluid retaining cavity, and wherein coupling the condensate drain tank to the reactor pressure vessel comprises the step of extending an injection line between the condensate drain tank and the reactor pressure vessel so that water may flow from the fluid retaining cavity to the reactor pressure vessel.

10. A passive containment system for a nuclear reactor, the nuclear reactor including a reactor pressure vessel having a core disposed therein, the reactor pressure vessel located in a containment, said system comprising:

at least one passive containment cooling condenser positioned outside the containment;

at least one condensate drain tank positioned inside the containment, said passive containment cooling condenser coupled to said condensate drain tank, said condensate drain tank coupled to the reactor pressure vessel by an injection line extending between the pressure vessel and said condensate drain tank;

a suppression pool coupled to the reactor pressure vessel;

a gravity driven cooling system cooling pool coupled to the pressure vessel by a gravity driven cooling system injection line extending between the reactor pressure vessel and said gravity driven cooling system pool;

a pipe connecting said gravity driven cooling system pool to said suppression pool;

a wall having a spill-over hole therein, said wall separating said suppression pool from the containment; and an equalizing line coupling said suppression pool to the reactor pressure vessel.

11. A passive containment system in accordance with claim 10 wherein said condensate drain tank comprises a base wall and a sidewall, said sidewall extending from said base wall to define a fluid retaining cavity.

12. A passive containment system in accordance with claim 10 further comprising at least one injection line extending between the reactor pressure vessel and said at least one condensate drain tank, said at least one injection line configured to transport fluid between said at least one condensate drain tank and the reactor pressure vessel.

13. A passive containment system in accordance with claim 12 wherein said injection line comprises a first end and a second end, and wherein a valve is positioned between said first and second ends.

14. A passive containment system in accordance with claim 13 wherein said valve is movable between an open position and a closed position.

15. A passive containment system in accordance with claim 10 further comprising at least one condensate drain line extending between said at least one passive containment cooling condenser and said at least one condensate drain tank.

16. A passive containment system in accordance with claim 10 comprising a set of passive containment cooling condensers, said set comprising two passive containment cooling condensers.

17. A passive containment system in accordance with claim 10 comprising one condensate drain tank.

18. A passive containment system in accordance with claim 10 wherein said condensate drain tank is positioned in the containment.

* * * * *